United States Patent [19]
O'Brien et al.

[11] 3,863,726
[45] Feb. 4, 1975

[54] TRACKED DRIVE FOR VEHICLES

[76] Inventors: Roy E. O'Brien, 17834 Millar Rd., Mt. Clemens, Mich. 48043; Donald J. Leslie, 1310 N. Washington, Apt. No. 11, Royal Oak, Mich. 48067; Michael R. Leslie, 1947 Robina Ave., Berkley, Mich. 48072

[22] Filed: Apr. 23, 1973

[21] Appl. No.: 353,599

[52] U.S. Cl. .................. 180/5 A, 180/9.5
[51] Int. Cl. ............................................ B62d 55/04
[58] Field of Search ............. 180/5 A, 9.2 C, 9.2 R, 180/9.54, 9.5

[56] References Cited
UNITED STATES PATENTS

| | | | |
|---|---|---|---|
| 1,084,187 | 1/1914 | Wiberg | 180/5 A |
| 1,292,427 | 1/1919 | Brekken | 180/5 A |
| 1,449,036 | 3/1923 | Feden | 180/5 A |
| 3,689,123 | 9/1972 | Barbieri | 180/9.5 |
| 3,737,001 | 6/1973 | Rasenberger | 180/5 A |

*Primary Examiner*—Philip Goodman
*Attorney, Agent, or Firm*—Whittemore, Hulbert & Belknap

[57] ABSTRACT

A tracked drive is provided for mounting on the rear axle of a normally wheeled vehicle to convert the wheeled vehicle into a snowmobile-like vehicle.

9 Claims, 4 Drawing Figures

TRACKED DRIVE FOR VEHICLES

BACKGROUND OF THE INVENTION

Snowmobiles have come into widespread popularity in recent years. Snowmobiles permit traveling off-the-road during the winter months. It would be desirable to provide means for converting a conventional wheeled automobile, truck, tractor, bus, bicycle, motorcycle, and like vehicles, to a construction similar to a snowmobile to permit use of such vehicles off-the-road in the winter months and to further facilitate use of such vehicles on ordinary roadways which become snow covered in the winter.

In our co-pending application, Ser. No. 324,205, filed Jan. 16, 1973, we have disclosed a ski construction for conversion of the front axle structure of a vehicle from ordinary wheels to skis. In the present invention, we have provided an endless track system for the rear drive of a vehicle to thereby, in connection with the disclosed ski construction, provide a conversion unit to completely modify the conventional vehicle to a snowmobile-like vehicle.

SUMMARY OF THE INVENTION

A tracked drive for vehicles having a driven axle is provided. An endless ground-engaging track is operatively mounted in a housing. First sprocket means are journaled in said housing in operative engagement with the track for driving the track. Second sprocket means are connectible to the vehicle axle to be driven thereby. Means are provided for drivingly connecting the first and second sprocket means. Means are provided for connecting the track drive to a vehicle. The tracked drive is particularly suited for connection to the rear axle of a conventional automobile or truck. One tracked drive unit is provided to replace each of the rear wheels on the vehicle.

IN THE DRAWINGS

Figure 1:
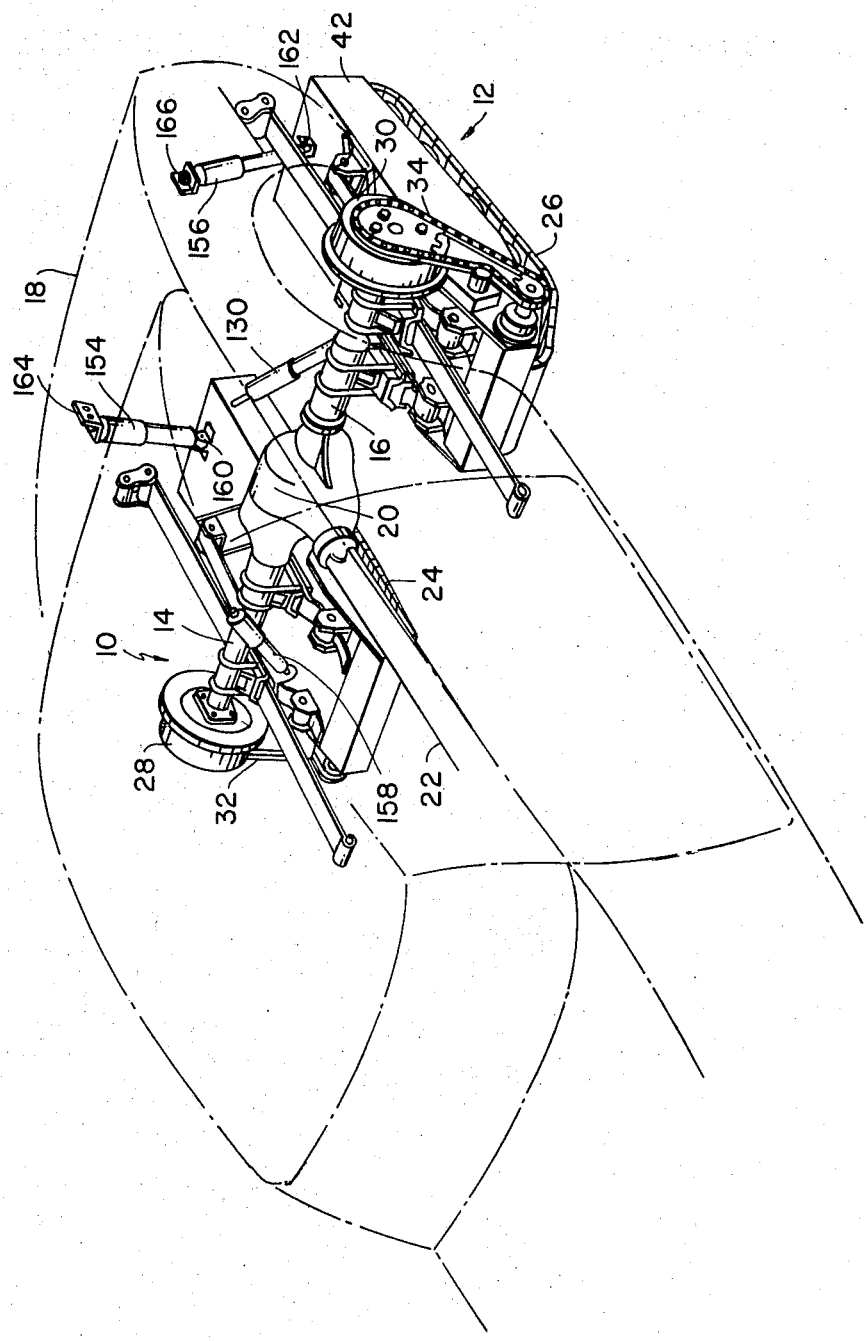
FIG. 1 is a view in perspective of the tracked drive for vehicles of the present invention illustrating one embodiment thereof mounted on a conventional automobile.

Referring to FIG. 1, it will be noted that the tracked drive for a vehicle comprises a pair of drive units 10, 12 each secured to and driven by one of the rear axle segments 14, 16 of an automobile 18. A conventional rear axle assembly is shown wherein the axle segments 14, 16 are connected to a differential 20 which in turn is connected to the vehicle drive shaft 22 which is driven by the vehicle power plant.

Each of the drive units 10, 12 includes an endless track 24, 26 which engages the ground for driving of the vehicle. Each track 24, 26 is separately driven from its respective axle hub 28, 30 via a chain 32, 34.

Figure 2:
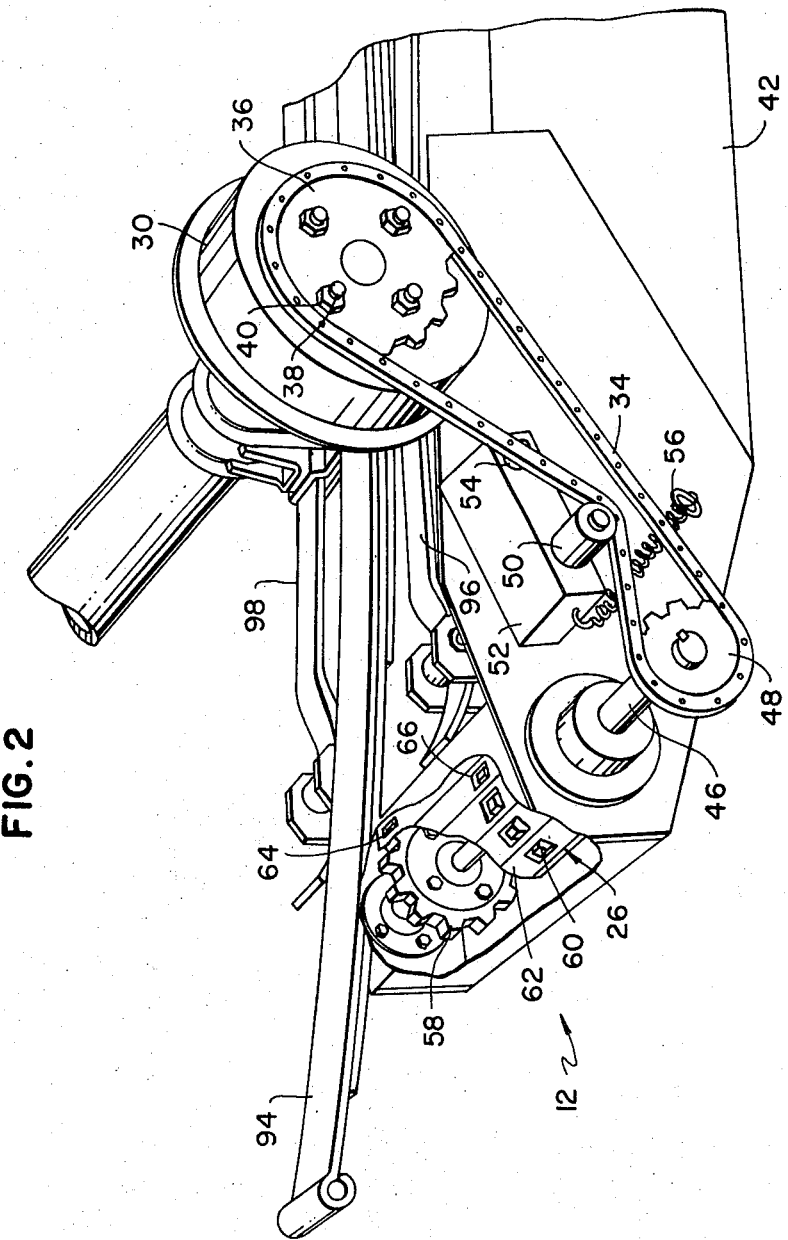
FIG. 2 is a view in perspective of an enlarged scale of the forward portion of the left hand tracked drive of FIG. 1 with portions removed for the purpose of clarity.
Figure 3:
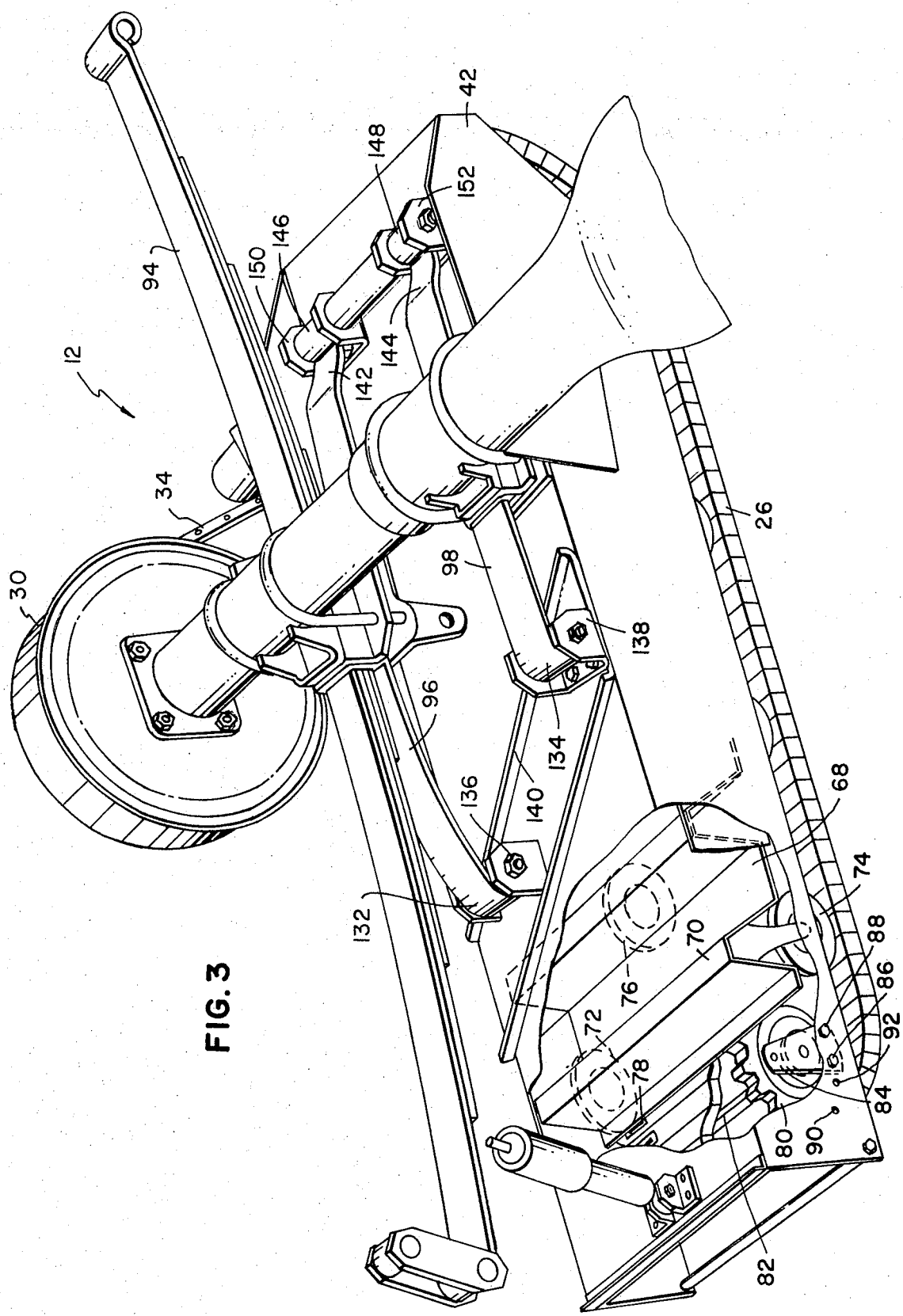
FIG. 3 is a perspective view of the left hand tracked drive of FIG. 1 viewed from the opposite side and shown on an enlarged scale.

As is more clearly shown in FIGS. 2 and 3, wherein the drive unit 12 is illustrated, the chain 34 engages a toothed sprocket 36 which is directly mounted on the usual lugs 38 of the hub 30 by means of bolts 40. The sprocket 36 is configured to fit directly onto the hub 30 in the same manner as the regular wheel of the car without any modification necessary. Differently configured sprockets 36 may be provided for the differently configured hubs of various vehicle models which are sold.

The components of the drive unit 12 are mounted in an elongated housing 42, the bottom of which is open for projection of the endless track 26 therethrough into engagement with the ground surface. A drive shaft 46 is journaled in the forward end of the housing 42. The shaft 46 extends out of the housing 42 on one side thereof. A toothed sprocket 48 is fixed to the outer end of the shaft. The sprocket 48 is in engagement with the chain 34 to be driven thereby. An idler roller 50 is provided above the chain 34. The roller 50 is rotatably mounted on a box-like support 52 which is pivotally mounted to the housing 42 by means of pivot 54. A coil tension spring 56 is connected at one end to the support 52 and at the other end to the housing 42. The spring 56 biases the roller 50 into the chain 34 to thereby provided the proper chain tension.

As will be noted from the relative sizes of the sprockets 36, 48, there is a step-up relationship in angular velocity from the sprocket 36 to the smaller sprocket 48. This speed relationship may be altered by changing the sprocket sizes as desired. The angular velocity of the sprocket 48 controls the linear velocity of the track 26. If it were desired to have a slower track speed at higher torque, the sprocket 48 may be provided in a larger diameter or the diameter of the sprocket 36 may be reduced.

A pair of spaced apart toothed sprockets 58, 60 are fixedly mounted on the drive shaft 46 in engagement with the track 26. As will be noted, the track 26 is fabricated of a plurality of transversely extending track segments 62. Each segment 62 is provided with a pair of spaced apart openings 64, 66 for engagement with the teeth of the sprockets 58, 60. The forward portion of the track 26 is elevated from the ground surface so that the sprocket teeth will not engage the ground.

As best shown in FIG. 3, the lower run of the track 26 is supported by a plurality of rollers so that it will now sag into the housing 42. A roller support structure 68 is secured within the housing 42. The support structure 68 is fabricated of sheet metal and includes a plurality of longitudinally spaced apart upwardly extending projections 70. The projections 70 alternately have a pair of outer rollers 72, 74 and a single central roller 76. By this method, the outer edge portions of the lower run of the track 26 are supported as well as the center portion of the lower track run.

As will be noted in FIG. 3, a pair of toothed sprockets 78, 80 are provided at the rear of the track 26. The sprockets 78, 80 are journaled on an axle 82 which is journaled at each end on an adjustable bracket 84. As will be noted, the bracket 84 includes openings for a pair of bolts 86, 88 which are received in openings provided in the housing 42. The bracket position may be adjusted by shifting the bolts to adjacent openings 90, 92. Adjustment of the bracket position adjusts the tension applied to the track 26. In this manner, the slack may be taken out of the track.

Figure 4:
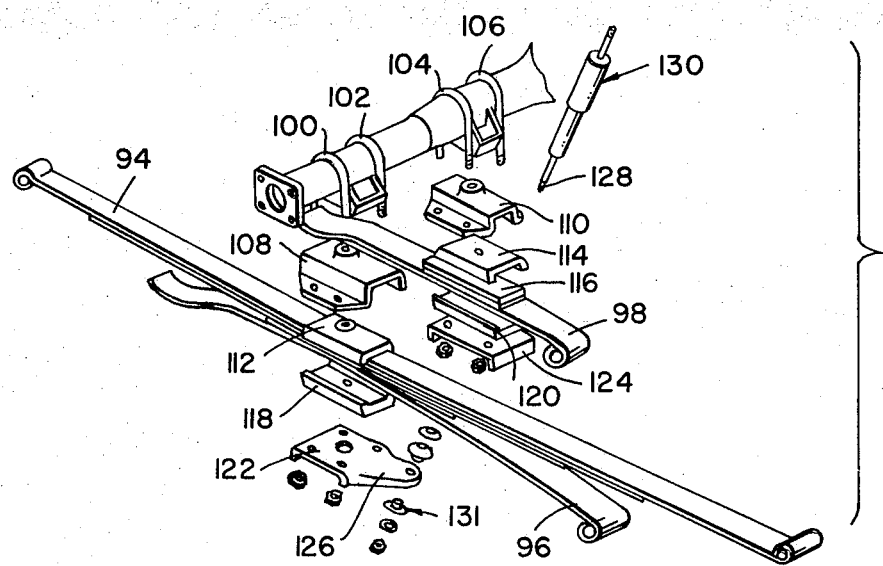
FIG. 4 is an exploded view of the structure for mounting the tracked drive to a vehicle.

The drive unit is mounted on the vehicle 18 by means of the structure illustrated in FIG. 4. In addition to the already installed leaf spring 94 which is in place on the vehicle at the time of installing the drive unit, additional springs 96 and 98 are added. The leaf spring 94 is conventionally mounted to the axle by means of a U-bolt and bracket structure. The in-place U-bolt and bracket structure for the leaf spring 94 is removed when installing the drive unit. A similar U-bolt and bracket structure is provided for mounting the spring 96 and the spring 98. As will be noted in FIG. 4, the mounting structure includes pairs of U-bolts 100, 102, 104, 106, a spring saddle bracket 108, 110, an insulator spring 112, 14, spacers 116 for spring 98, a lower insulating spring 118, 120 and lower clamp brackets 122, 124. The clamp bracket 122 has a projection 126 with an opening therein to receive one end 128 of a shock absorber 130. The other end of the shock absorber 130 is connected to the vehicle frame in the usual manner. Appropriate nut and washer structures 131 are provided to secure these elements in place.

Referring to FIG. 3, it will be noted that one end 132, 134 of springs 96, 98 are fixedly secured to brackets 136, 138 carried on cross member 140 is secured to the housing 42. The ends 132, 134 are turned in so as to be pivotally mounted on central rod portions of the brackets 136, 138. The other ends 142, 144 of the spprings are slidingly received beneath rollers 146, 148 provided in brackets 150, 152 which are secured to the housing 42. In this fashion, the springs 96, 98 are free to flex during use of the drive unit. The provision of the extra springs not only provides a convenient method for mounting of the drive unit but also "beefs" up the spring structure to accommodate the extra loading which may be encountered during use of the vehicle with the drive units installed.

As will be noted in FIG. 1, additional shock absorbers 154, 156 are provided at the rearward ends of the housing 42 to supplement shock absorbers 130, 158 which are connected between the spring brackets and vehicle frame at a point which represents approximately the mid or central portion of the drive unit. The shock absorbers 154, 156 are pivotally connected at one end to brackets 160, 162 secured to the housing 42 and at the other end to brackets 164, 166 which are attached to the vehicle frame.

The use of shock absorbers have been illustrated. However, it will be appreciated that other similar devices may also be employed such as air bags or elastomeric spring structures which are capable of absorbing shock.

What we claim as our invention is:

1. A tracked drive for vehicles having a driven axle having a leaf spring structure connected thereto comprising an endless ground-engaging track, a housing operatively mounting said track, first sprocket means journaled in said housing operatively engaging the track for driving same, second sprocket means connectible to the axle to be driven thereby, means drivingly connecting said first and second sprocket means, and means for connecting the tracked drive to a vehicle, said means for connecting the tracked drive to a vehicle including additional leaf spring means connected to the housing, and structure for connecting said additional leaf spring means to the vehicle leaf spring means and vehicle driven axle.

2. A tracked drive as defined in claim 1, further characterized in the provision of second leaf spring means connected to the housing but spaced from said additional leaf spring means, and structure for connecting said second leaf spring means to the vehicle axle.

3. A tracked drive for vehicles as defined in claim 2, further characterized in that said additional leaf spring means and said second leaf spring means are each pivotally connected at one end to the housing and slidably connected at the other end to the housing.

4. A tracked drive for vehicles as defined in claim 1, further characterized in the provision of shock absorbing means connected to the housing and connectible to a vehicle.

5. A tracked drive as defined in claim 4, further characterized in that said shock absorbing means are provided centrally of the housing.

6. A tracked drive as defined in claim 4, further characterized in that said shock absorbing means are provided at the rearward end of the housing.

7. A tracked drive as defined in claim 4, further characterized in that said shock absorbing means are provided at both the center and the rearward end of the housing.

8. A tracked drive for vehicles having a driven axle with means at each end of the axle for attachment of a wheel and having a pair of spaced apart leaf spring structures connected thereto comprising a tracked drive unit for each end of the axle, each drive unit comprising an endless ground-engaging track, a housing operatively mounting said track, first sprocket means journaled in said housing operatively engaging the track for driving same, second sprocket means connectible to the axle to be drive thereby, means drivingly connecting said first and second sprocket means, and means for connecting each tracked drive unit to the vehicle in driving engagement with one end of the vehicle axle, said means for connecting the track drive to a vehicle including additional leaf spring means connected to the housing, and structure for connecting said additional leaf spring means to the vehicle leaf spring means and vehicle driven axle.

9. A tracked drive as defined in claim 8, further characterized in the provision of second leaf spring means connected to the housing but spaced from said additional leaf spring means, and structure for connecting said second leaf spring means to the vehicle axle.

* * * * *

UNITED STATES PATENT OFFICE
CERTIFICATE OF CORRECTION

Patent No. 3,863,726        Dated   February 4, 1975

Inventor(s) Roy E. O'Brien, Donald J. Leslie & Michael R. Leslie

It is certified that error appears in the above-identified patent and that said Letters Patent are hereby corrected as shown below:

Column 2, line 22, delete "provided" and insert --provide--; line 44, delete "now" and insert --not--.

Column 3, line 10, delete "14" and insert --114--.

Signed and sealed this 15th day of April 1975.

(SEAL)
Attest:

RUTH C. MASON
Attesting Officer

C. MARSHALL DANN
Commissioner of Patents
and Trademarks